(12) United States Patent
Chuang et al.

(10) Patent No.: US 6,457,831 B1
(45) Date of Patent: Oct. 1, 2002

(54) PROJECTION DISPLAY USING REFLECTIVE LIGHT MODULATORS

(75) Inventors: Fu-Ming Chuang; Sheng-Hsiung Chan, both of Hsin-Chu Hsien (TW)

(73) Assignee: Prokia Technology Co., Ltd., Tainan Hsien (TW)

( * ) Notice: Subject to any disclaimer, the term of this patent is extended or adjusted under 35 U.S.C. 154(b) by 0 days.

(21) Appl. No.: 09/835,640

(22) Filed: Apr. 17, 2001

(51) Int. Cl.[7] .................. G03B 21/00; G03B 21/14; G02B 27/14; G02B 5/30

(52) U.S. Cl. .............. 353/33; 353/20; 359/495; 359/634

(58) Field of Search ............... 359/495, 496, 359/497, 477, 634; 348/502, 756, 779; 349/5–9; 353/20, 33, 81–84, 31

(56) References Cited

U.S. PATENT DOCUMENTS 6,262,851 B1 * 7/2001 Marshall .................. 349/5

6,384,972 B1 * 5/2002 Chuang .................. 348/756

* cited by examiner

Primary Examiner—Russell Adams
Assistant Examiner—Andrew Sever
(74) Attorney, Agent, or Firm—Foley & Lardner (57) ABSTRACT

In a projection display, input light is separated by a polarization beam splitter prism into first and second color components, and a third color component. The first and second color components, together with a light leakage component that is associated with the third color component, are directed by the polarization beam splitter prism to a color synthesizing prism or a color splitter prism set, which then separates the first and second color components and the light leakage component so as to travel in three different directions, respectively. The first and second color components from the color synthesizing prism or the color splitter prism set, and the third color component from the polarization beam splitter prism are processed by reflective first, second and third light modulators, respectively.

16 Claims, 5 Drawing Sheets

PROJECTION DISPLAY USING REFLECTIVE LIGHT MODULATORS

BACKGROUND OF THE INVENTION

1. Field of the Invention

The invention relates to a projection display, more particularly a single-lens projection display that utilizes reflective light modulators.

2. Description of the Related Art

In a conventional projection display, an input light beam, which contains red, green and blue color components, is processed before providing the same to a projection lens so as to generate an output image.

Figure 1:
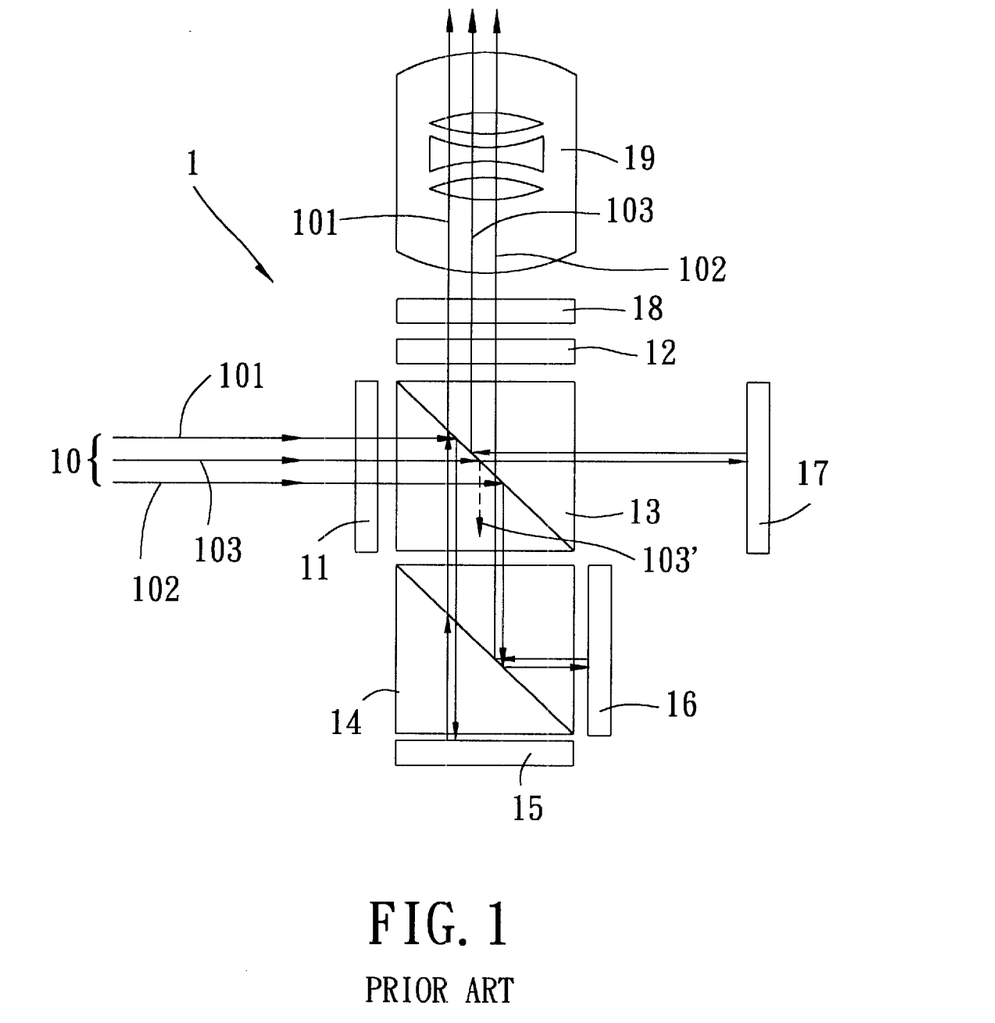
FIG. 1 is a schematic view showing a conventional single-lens projection display.

Referring to FIG. 1, a conventional single-lens projection display 1 is shown to include a first light polarization selector 11, a second light polarization selector 12, a polarization beam splitter prism 13, a dichroic beam splitter prism 14, a first light modulator 15, a second light modulator 16, a third light modulator 17, a polarizer 18, and a projection lens 19. An input light beam 10, which is a white light beam, is separated into first, second and third color components 101, 102, 103, such as red, green and blue color components, for processing by the first, second and third light modulators 15, 16, 17, respectively.

Each of the first and second light polarization selectors 11, 12, such as the ColorSelect™ filter products available from ColorLink Inc., serves to convert the polarization state of a predetermined color component, without altering the polarization state of the other color components. In the projection display 1 of FIG. 1, the polarization state of the third color component 103, such as the green color component, is changed, whereas the polarization state of the first and second color components 101, 102 remains unaltered, after the color components 101, 102, 103 pass through the first and second light polarization selectors 11, 12.

The polarization beam splitter prism 13 reflects light of a first polarization state, such as S-polarized light, in a transverse direction, and allows light of a second polarization state, such as P-polarized light, to pass therethrough.

The dichroic beam splitter prism 14 is used to separate two different color components. In the projection display 1 of FIG. 1, the dichroic beam splitter prism 14 allows the first color component 101 to pass directly therethrough, and reflects the second color component 102 in a transverse direction, thereby separating the first color component 101 from the second color component 102.

Each of the first, second and third light modulators 15, 16, 17 is a reflective light valve, and is disposed adjacent to one of the dichroic beam splitter prism 14 and the polarization beam splitter prism 13 so as to receive a respective one of the first, second and third color components 101, 102, 103 therefrom. When activated, each of the first, second and third light modulators 15, 16, 17 modulates the respective one of the first, second and third color components 101, 102, 103, and changes the polarization state of the respective one of the first, second and third color components 101, 102, 103. The first, second and third light modulators 15, 16, 17 then reflect modulated first, second and third color components 101, 102, 103 back to the adjacent one of the dichroic beam splitter prism 14 and the polarization beam splitter prism 13.

The polarizer 18 allows light of a predetermined polarization state to pass therethrough, and absorbs light of the other polarization state. In the projection display 1 of FIG. 1, the polarizer 18 allows P-polarized light to pass therethrough, and absorbs S-polarized light.

In operation, when the first light polarization selector 11 receives the S-polarized white input light beam 10, the S-polarization state of the first and second color components 101, 102, such as the red and blue color components, remains unaltered, whereas the S-polarization state of the third color component 103, such as the green color component, is changed to the P-polarization state, after the first, second and third color components 101, 102, 103 pass through the first light polarization selector 11. The polarization beam splitter prism 13 receives the S-polarized first and second color components 101, 102 and the P-polarized third color component 103 from the first light polarization selector 11 at a first side thereof, reflects the S-polarized first and second color components 101, 102 in a transverse direction such that the S-polarized first and second color components 101, 102 pass through a second side thereof, and permits the P-polarized third color component 103 to pass directly through a third side thereof opposite to the first side.

The dichroic beam splitter prism 14, which is disposed adjacent to the second side of the polarization beam splitter prism 13, receives the S-polarized first and second color components 101, 102 therefrom. The first color component 101 passes directly through the dichroic beam splitter prism 14, whereas the second color component 102 is reflected by the dichroic beam splitter prism 14 in a transverse direction.

The first and second light modulators 15, 16 are disposed adjacent to the dichroic beam splitter prism 14 so as to receive the S-polarized first and second color components 101, 102 respectively therefrom. The first and second light modulators 15, 16 modulate the respective one of the first and second color components 101, 102, and change the polarization state of the respective first or second color component 101, 102 from the S-polarization state to the P-polarization state when the first and second light modulators 15, 16 are activated. The first and second light modulators 15, 16 reflect the corresponding modulated color component back to the dichroic beam splitter prism 14 for reception by the polarization beam splitter prism 13.

The third light modulator 17 is disposed adjacent to the third side of the polarization beam splitter prism 13 so as to receive the P-polarized third color component 103 therefrom. The third light modulator 17 modulates the third color component 103, and changes the polarization state of the third color component 103 from the P-polarization state to the S-polarization state when the third light modulator 17 is activated. The third light modulator 17 reflects the modulated S-polarized third color component 103 back to the polarization beam splitter prism 13.

The modulated P-polarized first and second color components 101, 102 from the dichroic beam splitter prism 14 will be allowed by the polarization beam splitter prism 13 to pass directly through a fourth side thereof opposite to the second side for reception by the second light polarization selector 12. The modulated S-polarized third color component 103 from the third light modulator 17 will be reflected by the polarization beam splitter prism 13 in a transverse direction so as to pass through the fourth side thereof for reception by the second light polarization selector 12.

When the second light polarization selector 12 receives the modulated first, second and third color components 101, 102, 103 from the polarization beam splitter prism 13, the polarization state of the modulated P-polarized first and second color components 101, 102 remains unaltered, whereas the polarization state of the modulated S-polarized third color component 103 will be changed to the P-polarization state.

The polarizer 18 permits only pure P-polarized color components to pass therethrough, and absorbs S-polarized color components. The modulated P-polarized first, second and third color components 101, 102, 103 from the polarizer 18 are recombined as they pass through the projection lens 19 for projecting a color image on a display screen (not shown).

In the conventional projection display 1, the dichroic beam splitter prism 14 and the polarization beam splitter prism 13 cooperate with the first and second light polarization selectors 11, 12 to separate the white input light beam 10 into the three color components 101, 102, 103 that are modulated by the three light modulators 15, 16, 17. However, in view of current manufacturing constraints, the polarization beam splitter 13 does not permit a very high transmission for P-polarized light. Thus, when the P-polarized third color component 103 is received by the polarization beam splitter prism 13, a small portion of the P-polarized third color component 103 will be reflected by the polarization beam splitter prism 13 to pass through the second side thereof, i.e. toward the dichroic beam splitter prism 14, thus resulting in a light leakage component 103'. This light leakage component 103' will then be provided by the dichroic beam splitter prism 14 to the first or second light modulator 15, 16. When the first or second light modulator 15, 16 is inactive, the light leakage component 103' will be reflected back to the dichroic beam splitter prism 14, and pass through the polarization beam splitter prism 13, the second light polarization selector 12, and the polarizer 18 to reach the projection lens 19, thereby resulting in a shift in the gray scale coordinate of the projected image and in a reduction in the image contrast to adversely affect the output quality of the projection display 1.

SUMMARY OF THE INVENTION

Therefore, the main object of the present invention is to provide a projection display that utilizes reflective light modulators and that is capable of overcoming the aforesaid light leakage drawback of the prior art to enhance both contrast and output image quality.

According to one aspect of the present invention, a projection display is adapted to process an input light beam that includes a first color component, a second color component and a third color component, and comprises:

a polarization beam splitter prism having a first side adapted to receive the input light beam, a second side, a third side opposite to the first side, and a fourth side opposite to the second side, the polarization beam splitter prism being adapted to separate the input light beam into the first and second color components, which pass through the second side thereof, and the third color component, a large portion of which passes through the third side thereof, the polarization beam splitter prism further allowing a small portion of the third color component, which serves as a light leakage component, to pass through the second side thereof;

a color synthesizing prism disposed adjacent to the second side of the polarization beam splitter prism, and adapted to separate the first and second color components and the light leakage component from the polarization beam splitter prism so as to travel in three different directions, respectively;

reflective first and second light modulators disposed adjacent to the color synthesizing prism so as to receive the first and second color components respectively therefrom, the first and second light modulators modulating the respective one of the first and second color components and changing polarization state of the respective one of the first and second color components when activated, the first and second light modulators reflecting modulated first and second color components back to the color synthesizing prism; and a reflective third light modulator disposed adjacent to the third side of the polarization beam splitter prism so as to receive the third color component therefrom, the third light modulator modulating the third color component and changing polarization state of the third color component when activated, the third light modulator reflecting a modulated third color component back to the polarization beam splitter prism.

According to another aspect of the present invention, a projection display is adapted to process an input light beam that includes a first color component, a second color component and a third color component, and comprises:

a polarization beam splitter prism having a first side adapted to receive the input light beam, a second side, a third side opposite to the first side, and a fourth side opposite to the second side, the polarization beam splitter prism being adapted to separate the input light beam into the first and second color components, which pass through the second side thereof, and the third color component, a large portion of which passes through the third side thereof, the polarization beam splitter prism further allowing a small portion of the third color component, which serves as a light leakage component, to pass through the second side thereof;

a color splitter prism set disposed adjacent to the second side of the polarization beam splitter prism, and adapted to separate the first and second color components and the light leakage component from the polarization beam splitter prism so as to travel in three different directions, respectively;

reflective first and second light modulators disposed adjacent to the color splitter prism set so as to receive the first and second color components respectively therefrom, the first and second light modulators modulating the respective one of the first and second color components and changing polarization state of the respective one of the first and second color components when activated, the first and second light modulators reflecting modulated first and second color components back to the color splitter prism set; and a reflective third light modulator disposed adjacent to the third side of the polarization beam splitter prism so as to receive the third color component therefrom, the third light modulator modulating the third color component and changing polarization state of the third color component when activated, the third light modulator reflecting a modulated third color component back to the polarization beam splitter prism.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 2:
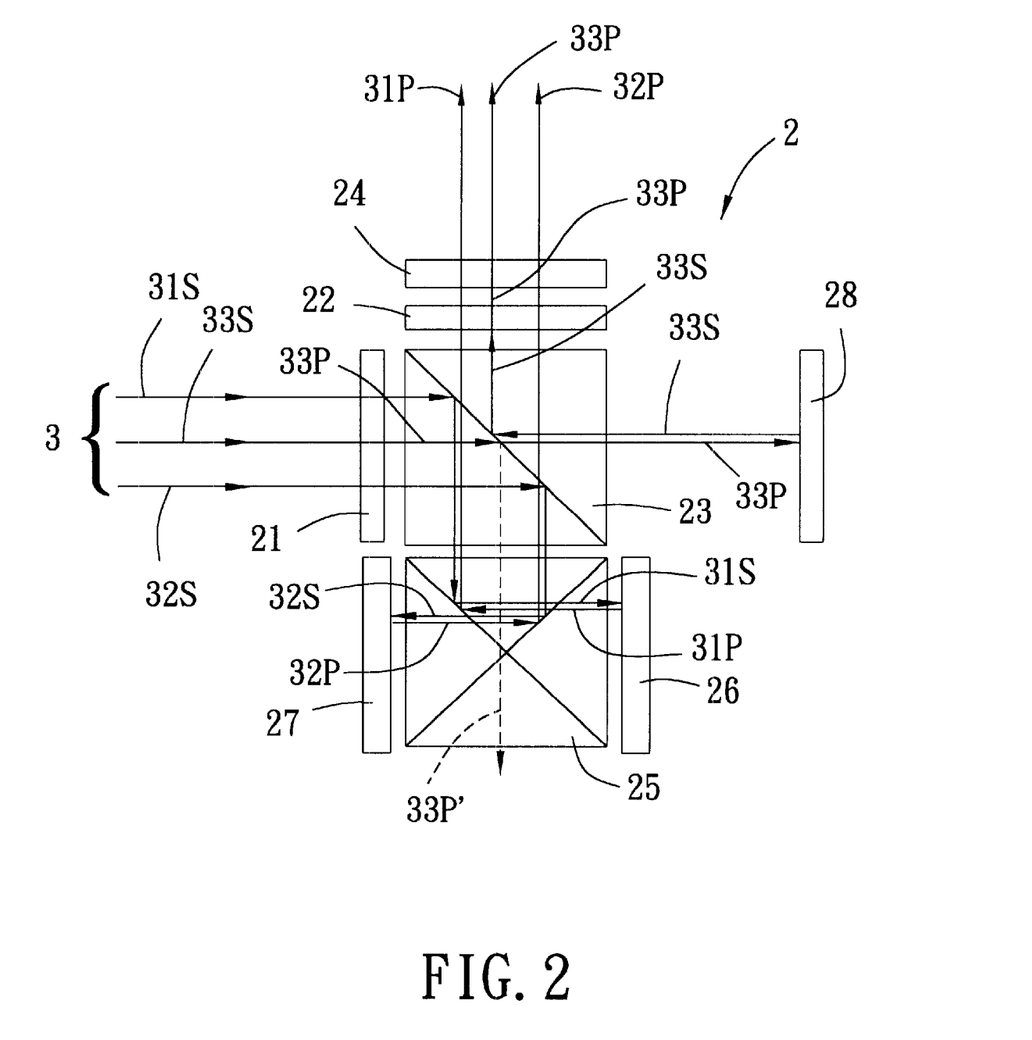
FIG. 2 is a schematic view showing the first preferred embodiment of a projection display according to the present invention.

Referring to FIG. 2, the first preferred embodiment of a projection display 2 according to the present invention is shown to include a first light polarization selector 21, a second light polarization selector 22, a polarization beam splitter prism 23, a polarizer 24, a color synthesizing prism 25, a first light modulator 26, a second light modulator 27, a third light modulator 28, and a projection lens (not shown). A white input light beam 3 contains S-polarized first, second and third color components 31S, 32S, 33S, such as red, green and blue color components, that are to be modulated by the first, second and third light modulators 26, 27, 28, respectively.

Each of the first and second light polarization selectors 21, 22, such as the ColorSelect™ filter products available from ColorLink Inc., serves to convert the polarization state of a predetermined color component, without altering the polarization state of the other color components. In the projection display of this embodiment, the polarization state of the third color component 33, such as the green color component, is changed, whereas the polarization state of the first and second color components 31, 32, such as the red and blue color components, remains unaltered, after the color components 31, 32, 33 pass through the first and second light polarization selectors 21, 22.

The polarization beam splitter prism 23 reflects light of a first polarization state, such as S-polarized light, in a transverse direction, and allows light of a second polarization state, such as P-polarized light, to pass therethrough. In the embodiment of FIG. 2, the polarization beam splitter prism 23 has a first side disposed adjacent to the first light polarization selector 21, a second side disposed adjacent to the color synthesizing prism 25, a third side opposite to the first side and disposed adjacent to the third light modulator 28, and a fourth side opposite to the second side and disposed adjacent to the second light polarization selector 22. In view of the characteristics of the polarization beam splitter prism 23, when the P-polarized third color component 33P is received by the polarization beam splitter prism 23 from the first light polarization selector 21, a small portion of the P-polarized third color component 33P will be reflected by the polarization beam splitter prism 23 to pass through the second side thereof, i.e. toward the color synthesizing prism 25, thus resulting in a light leakage component 33P'.

The polarizer 24, which is disposed adjacent to the second light polarization selector 22, allows light of a predetermined polarization state to pass therethrough, and absorbs light of the other polarization state. In the present embodiment, the polarizer 24 allows P-polarized light to pass therethrough, and absorbs S-polarized light.

The color synthesizing prism 25 receives the S-polarized first and second color components 31S, 32S and the light leakage component 33P' from the polarization beam splitter prism 23. In the present embodiment, the color synthesizing prism 25 reflects the S-polarized first and second color components 31S, 32S in opposing transverse directions, and allows the light leakage component 33P' to pass directly therethrough.

Each of the first, second and third light modulators 26, 27, 28 is a reflective light valve, and is disposed adjacent to one of the color synthesizing prism 25 and the polarization beam splitter prism 23 so as to receive a respective one of the first, second and third color components 31, 32, 33 therefrom. In this embodiment, the first and second light modulators 26, 27 are disposed adjacent to opposite sides of the color synthesizing prism 25, whereas the third light modulator 28 is disposed adjacent to the third side of the polarization beam splitter prism 23. When activated, each of the first, second and third light modulators 26, 27, 28 modulates the respective one of the first, second and third color components 31, 32, 33, and changes the polarization state of the respective one of the first, second and third color components 31, 32, 33. The first, second and third light modulators 26, 27, 28 then reflect modulated first, second and third color components 31, 32, 33 back to the adjacent one of the color synthesizing prism 25 and the polarization beam splitter prism 23.

In operation, when the first light polarization selector 21 receives the S-polarized white input light beam 3, the S-polarization state of the first and second color components 31S, 32S remains unaltered, whereas the polarization state of the third color component 33S is changed to the P-polarization state, after the first, second and third color components 31S, 32S, 33S pass through the first light polarization selector 21. The polarization beam splitter prism 23 receives the S-polarized first and second color components 31S, 32S and the P-polarized third color component 33P from the first light polarization selector 21 at the first side thereof, reflects the S-polarized first and second color components 31S, 32S in a transverse direction such that the S-polarized first and second color components 31S, 32S pass through the second side thereof toward the color synthesizing prism 25, permits a large portion of the P-polarized third color component 33P to pass directly through the third side thereof toward the third light modulator 28, and reflects a small portion of the P-polarized third color component 33P, i.e. the light leakage component 33P', in the transverse direction so as to pass through the second side thereof.

The color synthesizing prism 25 receives the S-polarized first and second color components 31S, 32S and the light leakage component 33P' from the polarization beam splitter prism 23. The color synthesizing prism 25 reflects the S-polarized first color component 31S in a first transverse direction for reception by the first light modulator 26, and further reflects the S-polarized second color component 32S in a second transverse direction for reception by the second light modulator 27. The color synthesizing prism 25 permits the light leakage component 33P' to pass directly therethrough, thereby preventing the light leakage component 33P' from reaching the projection lens (not shown). A shift in the gray scale coordinate of the projected image can thus be avoided to enhance both the image contrast and the output quality of the projection display 2.

The first and second light modulators 26, 27 receive the S-polarized first and second color components 31S, 32S from the color synthesizing prism 25, modulate the respective one of the S-polarized first and second color components 31S, 32S, and change the polarization state of the respective one of the first and second color components 31S, 32S from the S-polarization state to the P-polarization state when the first and second light modulators 26, 27 are activated. The first and second light modulators 26, 27 then reflect the corresponding modulated P-polarized color component 31P, 32P back to the color synthesizing prism 25 for reception by the polarization beam splitter prism 23.

The third light modulator 28 receives the P-polarized third color component 33P from the polarization beam splitter prism 23, modulates the P-polarized third color component 33P, and changes the polarization state of the third color component 33P from the P-polarization state to the S-polarization state when the third light modulator 28 is activated. The third light modulator 28 reflects the modulated S-polarized third color component 33S back to the polarization beam splitter prism 23.

The modulated P-polarized first and second color components 31P, 32P from the color synthesizing prism 25 will be allowed by the polarization beam splitter prism 23 to pass directly through the fourth side thereof for reception by the second light polarization selector 22. The modulated S-polarized third color component 33S from the third light modulator 28 will be reflected by the polarization beam splitter prism 23 in a transverse direction so as to pass through the fourth side thereof for reception by the second light polarization selector 22.

When the second light polarization selector 22 receives the modulated first, second and third color components 31P, 32P, 33S from the polarization beam splitter prism 23, the polarization state of the modulated P-polarized first and second color components 31P, 32P remains unaltered, whereas the polarization state of the modulated S-polarized third color component 33S will be changed to the P-polarization state.

The polarizer 24 permits only pure P-polarized color components to pass therethrough, and absorbs S-polarized color components. The modulated P-polarized first, second and third color components 31P, 32P, 33P from the polarizer 24 are recombined as they pass through the projection lens (not shown) for projecting a color image on a display screen (not shown).

Figure 3:
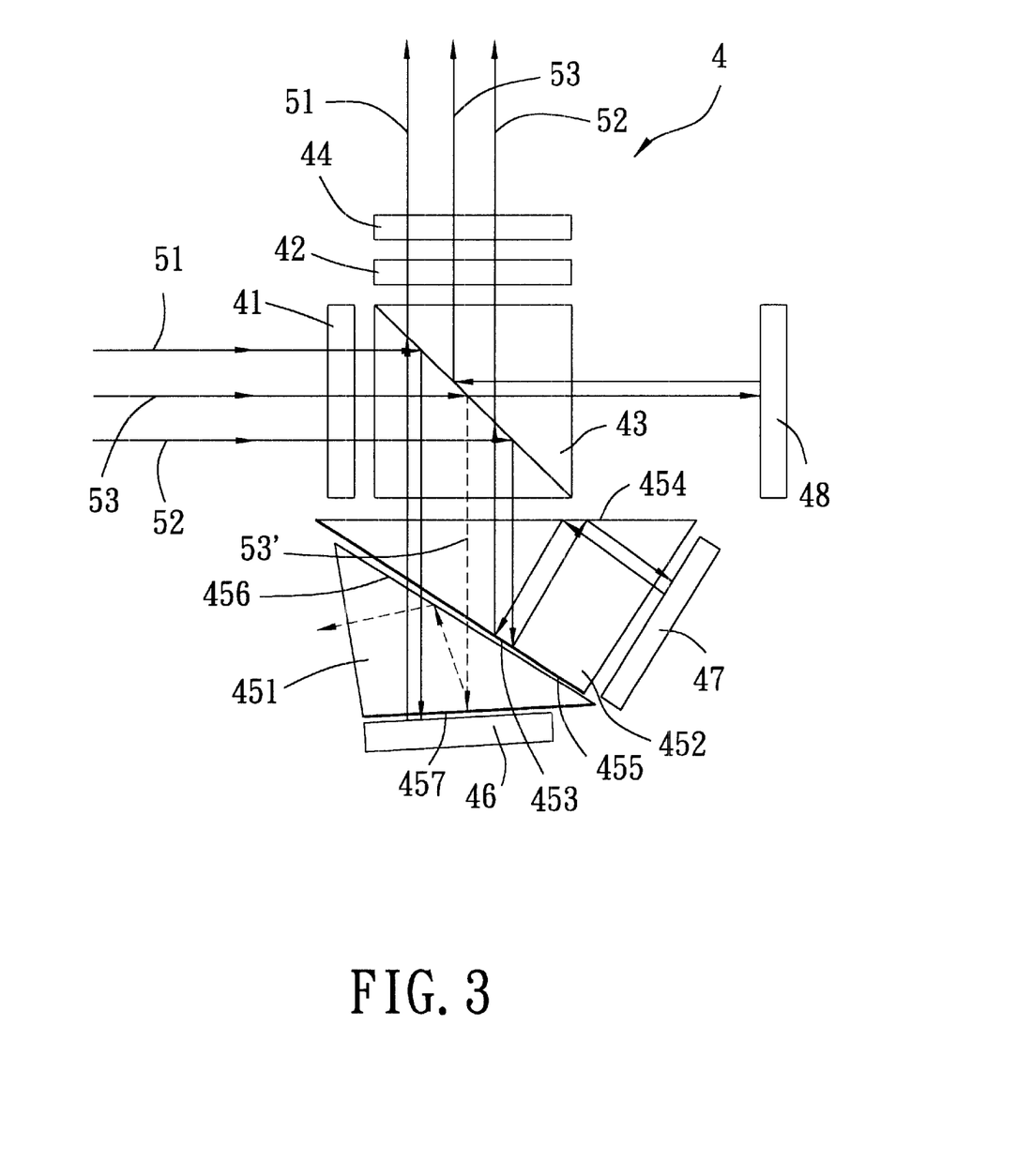
FIG. 3 is a schematic view showing the second preferred embodiment of a projection display according to the present invention.

Referring to FIG. 3, the second preferred embodiment of a projection display 4 according to the present invention is shown to include a first light polarization selector 41, a second light polarization selector 42, a polarization beam splitter prism 43, a polarizer 44, a first light modulator 46, a second light modulator 47, a third light modulator 48, and a projection lens (not shown). However, unlike the first preferred embodiment, which uses a color synthesizing prism 25, the projection display 4 of this embodiment additionally includes a color splitter prism set formed from first and second color splitter prisms 451, 452. The first color splitter prism 451 has a first side formed as a total reflection interface 456, a second side formed as a light splitting interface 457 and disposed adjacent to the first light modulator 46, and a third side. The second color splitter prism 452 has a first side formed as a total reflection interface 454 and disposed adjacent to the second side of the polarization beam splitter prism 43, a second side formed as a light splitting interface 455 and disposed adjacent to the total reflection interface 456 of the first color splitter prism 451, and a third side disposed adjacent to the second light modulator 47. The light splitting interface 455 of the second color splitter prism 452 cooperates with the total reflection interface 456 of the first color splitter prism 451 to form a clearance 453 therebetween.

In use, when the second color splitter prism 452 receives the second color component 52 from the polarization beam splitter prism 43 at the total reflection interface 454 thereof, the second color component 52 is subsequently reflected entirely back to the total reflection interface 454 by the second light splitting interface 455 so as to pass through the third side of the second color splitter prism 452 for reception by the second light modulator 47. When activated, the second light modulator 47 modulates the second color component 52, and changes the polarization state of the second color component 52. The second light modulator 47 then reflects the modulated second color component 52 back to the second color splitter prism 452 for reception by the polarization beam splitter prism 43.

On the other hand, when the second color splitter prism 452 receives the first color component 51 from the polarization beam splitter prism 43 at the total reflection interface 454 thereof, the first color component 51 will be allowed to pass directly through the light splitting interface 455 for reception by the first color splitter prism 451 at the total reflection interface 456 of the latter. The first color splitter prism 451 allows the first color component 51 to pass directly through the light splitting interface 457 for reception by the first light modulator 46. When activated, the first light modulator 46 modulates the first color component 51, and changes the polarization state of the first color component 51. The first light modulator 46 then reflects the modulated first color component 51 back to the first color splitter prism 451 for passage through the second color splitter prism 452 prior to reception by the polarization beam splitter prism 43.

Like the previous embodiment, the polarization beam splitter prism 43 permits a large portion of the third color component 53 to pass directly through the third side thereof toward the third light modulator 48 for processing in the manner described beforehand. A small portion of the third color component 53, i.e. the light leakage component 53', is reflected by the polarization beam splitter prism 43 in the transverse direction so as to be received by the second color splitter prism 452 at the total reflection interface 454 of the latter. The second color splitter prism 452 permits the light leakage component 53' to pass directly through the color splitting interface 455 thereof for reception by the first color splitter prism 451 at the total reflection interface 456. The light leakage component 53' is reflected entirely by the color splitting interface 457 back to the total reflection interface 456, which then reflects the same to pass through the third side of the first color splitter prism 451, thereby preventing the light leakage component 53' from reaching the projection lens (not shown). Stability in the gray scale coordinate of the projected image can thus be ensured to enhance both the image contrast and the output quality of the projection display 4.

The modulated first, second and third color components 51, 52, 53 will be directed by the polarization beam splitter prism 43 to pass in sequence through the second light polarization selector 42, the polarizer 44, and the projection lens (not shown) for projecting a color image on a display screen (not shown).

Figure 4:
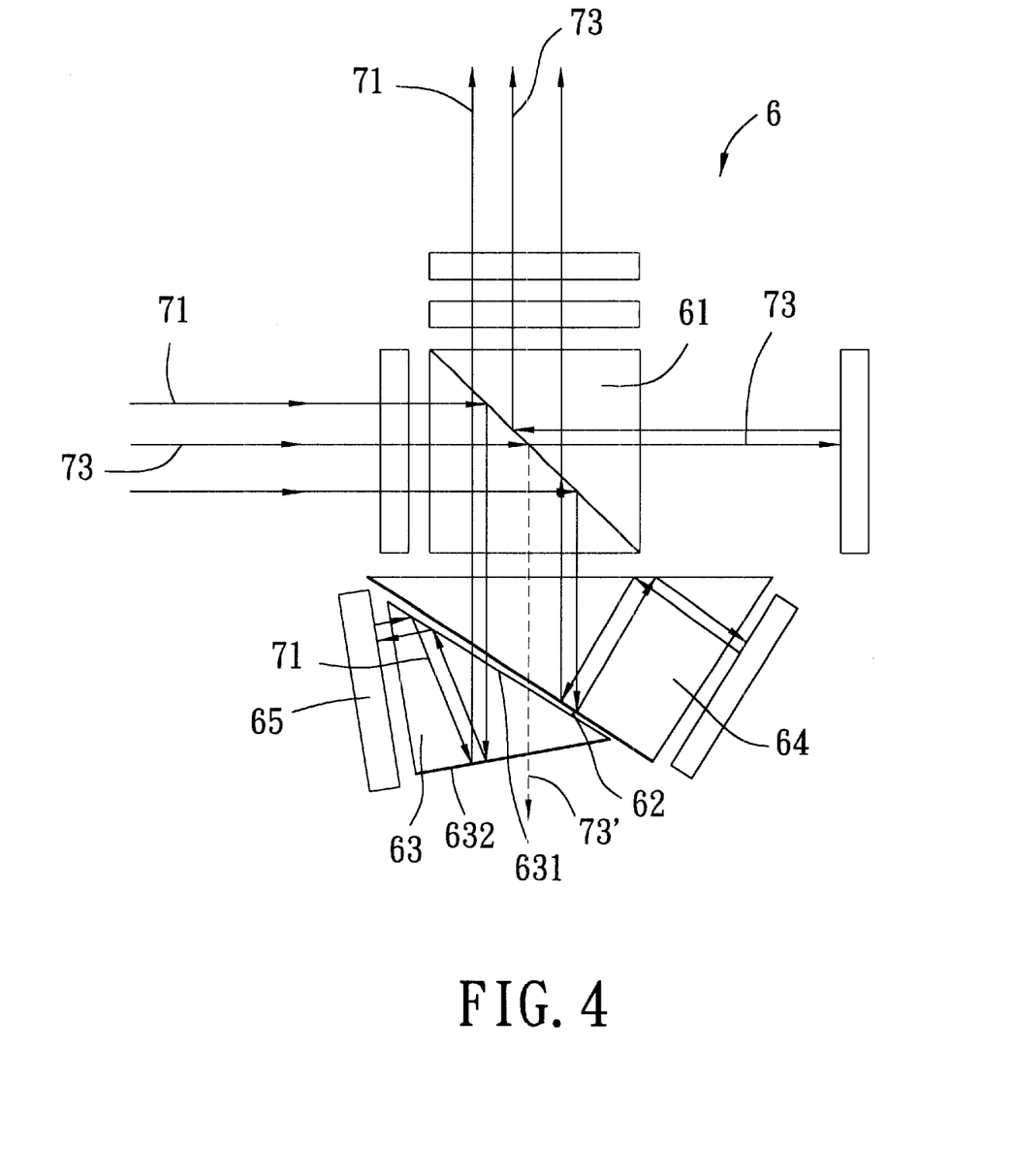
FIG. 4 is a schematic view showing the third preferred embodiment of a projection display according to the present invention.

FIG. 4 illustrates the third preferred embodiment of a projection display 6 according to the present invention, which is a modification of the second preferred embodiment. Like the embodiment of FIG. 3, a color splitter prism set includes first and second color splitter prisms 63, 64 that have a clearance 62 formed therebetween. However, unlike the previous embodiment, the first color splitter prism 63 has a first side formed as a total reflection interface 631 adjacent to the second color splitter prism 64, a second side formed as a light splitting interface 632, and a third side disposed adjacent to the first light modulator 65.

When the first color component 71 passes through the second color splitter prism 64 for reception by the first color splitter prism 63 at the total reflection interface 631 thereof, the first color component 71 will be reflected entirely by the color splitting interface 632 back to the total reflection interface 631, which then reflects the same to pass through the third side of the first color splitter prism 63 for processing by the first light modulator 65. On the other hand, the small portion of the third color component 73, i.e. the light leakage component 73', that is reflected by the polarization beam splitter prism 61 and that passes through the second color splitter prism 64, will be allowed by the first color splitter prism 63 to pass through the total reflection interface 631 and the light splitting interface 632, thereby preventing the light leakage component 73' from reaching the projection lens (not shown) of the projection display 6.

It has thus been shown that, with the inclusion of a color synthesizing prism or a color splitter prism set, the light leakage component that is attributed to the third color component can be prevented from reaching the projection lens so as to ensure stability in the gray scale coordinate of the projected image and to thereby enhance both the image contrast and the output quality of the projection display.

Figure 5:
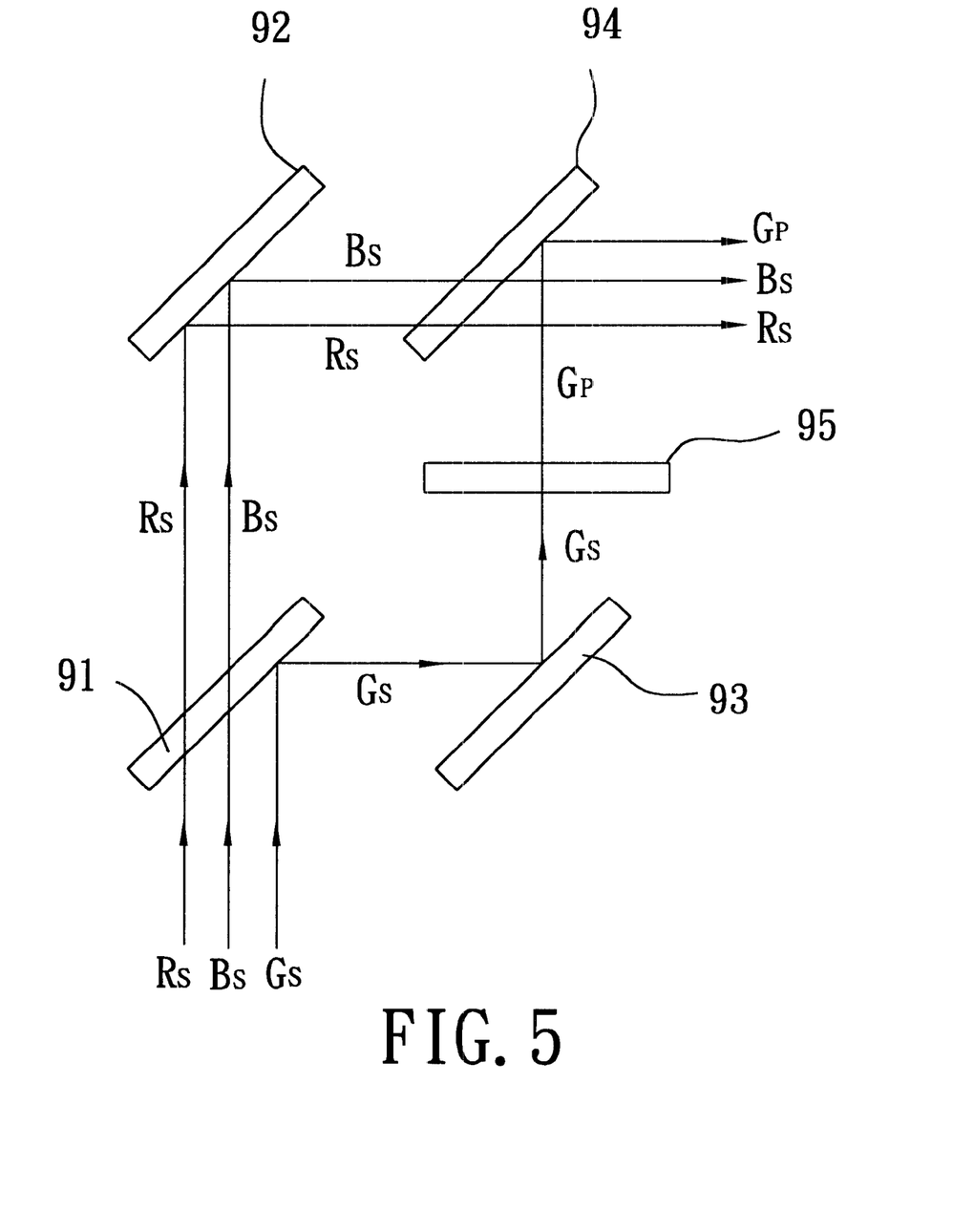
FIG. 5 is a schematic view showing a first light polarization selector for the projection display of this invention.

FIG. 5 illustrates a first light polarization selector that is suitable for use in any one of the projection displays of FIGS. 2, 3 and 4. As shown, a first dichroic mirror 91 receives S-polarization first, second and third color components Rs, Bs, Gs. The first dichroic mirror 91 allows the first and second color components Rs, Bs to pass therethrough in a first direction, and reflects the third color component Gs such that the third color components Gs travels in a second direction transverse to the first direction. A first reflective mirror 92 reflects the first and second color components Rs, Bs from the first dichroic mirror 91 such that the first and second color components Rs, Bs travel in a third direction transverse to the first direction and parallel to the second direction. A second reflective mirror 93 reflects the third color component Gs from the first dichroic mirror 91 such that the third color component Gs travels in a fourth direction transverse to the second direction and parallel to the first direction. A second dichroic mirror 94 receives the first and second color components Rs, Bs from the first reflective mirror 92. A half-wavelength plate 95 is disposed between the second reflective mirror 93 and the second dichroic mirror 94 and converts the polarization state of the third color component from S-polarization to P-polarization before the third color component reaches the second dichroic mirror 94. As such, the input light beam can be obtained by the polarization beam splitter prism of the projection display from the second dichroic mirror 94 of the first light polarization selector, and includes the S-polarization first and second color components Rs, Bs and the P-polarization third color component Gp.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A projection display adapted to process an input light beam that includes a first color component, a second color component and a third color component, said projection display comprising:

a polarization beam splitter prism having a first side adapted to receive the input light beam, a second side, a third side opposite to said first side, and a fourth side opposite to said second side, said polarization beam splitter prism being adapted to separate the input light beam into the first and second color components, which pass through said second side thereof, and the third color component, a large portion of which passes through said third side thereof, said polarization beam splitter prism further allowing a small portion of the third color component, which serves as a light leakage component, to pass through said second side thereof;

a color synthesizing prism disposed adjacent to said second side of said polarization beam splitter prism, and adapted to separate the first and second color components and the light leakage component from said polarization beam splitter prism so as to travel in three different directions, respectively;

reflective first and second light modulators disposed adjacent to said color synthesizing prism so as to receive the first and second color components respectively therefrom, said first and second light modulators modulating the respective one of the first and second color components and changing polarization state of the respective one of the first and second color components when activated, said first and second light modulators reflecting modulated first and second color components back to said color synthesizing prism; and a reflective third light modulator disposed adjacent to said third side of said polarization beam splitter prism so as to receive the third color component therefrom, said third light modulator modulating the third color component and changing polarization state of the third color component when activated, said third light modulator reflecting a modulated third color component back to said polarization beam splitter prism.

2. The projection display of claim 1, further comprising a first light polarization selector disposed adjacent to said first side of said polarization beam splitter prism and adapted to convert the polarization state of the third color component, said polarization beam splitter prism receiving the input light beam from said first light polarization selector.

3. The projection display of claim 2, wherein said polarization beam splitter prism receives from said color synthesizing prism the modulated first and second color components at said second side thereof, and receives from said third light modulator the modulated third color component at said third side thereof.

4. The projection display of claim 3, further comprising a second light polarization selector disposed adjacent to said fourth side of said polarization beam splitter prism, said second light polarization selector receiving the modulated first, second and third color components from said fourth side of said polarization beam splitter prism, and being adapted to convert the polarization state of the modulated third color component.

5. The projection display of claim 4, further comprising a polarizer disposed adjacent to said second light polarization selector so as to receive the modulated first, second and third color components therefrom, said polarizer being adapted to absorb light of a first polarization state and to permit light of a second polarization state to pass therethrough.

6. The projection display of claim 2, wherein said first light polarization selector includes:

a first dichroic mirror adapted to receive the first, second and third color components having a first polarization state, said first dichroic mirror allowing said first and second color components to pass therethrough in a first direction, and reflecting the third color component such that the third color components travels in a second direction transverse to the first direction;

a first reflective mirror for reflecting the first and second color components from said first dichroic mirror such that the first and second color components travel in a third direction transverse to the first direction and parallel to the second direction;

a second reflective mirror for reflecting the third color component from said first dichroic mirror such that the third color component travels in a fourth direction transverse to the second direction and parallel to the first direction;

a second dichroic mirror for receiving the first and second color components from said first reflective mirror; and a half-wavelength plate disposed between said second reflective mirror and said second dichroic mirror, and converting the polarization state of the third color component to a second polarization state before the third color component reaches said second dichroic mirror;

wherein the input light beam is obtained by said polarization beam splitter prism from said second dichroic mirror, and includes the first and second color components having the first polarization state and further includes the third color component having the second polarization state.

7. A projection display adapted to process an input light beam that includes a first color component, a second color component and a third color component, said projection display comprising:

a polarization beam splitter prism having a first side adapted to receive the input light beam, a second side, a third side opposite to said first side, and a fourth side opposite to said second side, said polarization beam splitter prism being adapted to separate the input light beam into the first and second color components, which pass through said second side thereof, and the third color component, a large portion of which passes through said third side thereof, said polarization beam splitter prism further allowing a small portion of the third color component, which serves as a light leakage component, to pass through said second side thereof;

a color splitter prism set disposed adjacent to said second side of said polarization beam splitter prism, and adapted to separate the first and second color components and the light leakage component from said polarization beam splitter prism so as to travel in three different directions, respectively;

reflective first and second light modulators disposed adjacent to said color splitter prism set so as to receive the first and second color components respectively therefrom, said first and second light modulators modulating the respective one of the first and second color components and changing polarization state of the respective one of the first and second color components when activated, said first and second light modulators reflecting modulated first and second color components back to said color splitter prism set; and a reflective third light modulator disposed adjacent to said third side of said polarization beam splitter prism so as to receive the third color component therefrom, said third light modulator modulating the third color component and changing polarization state of the third color component when activated, said third light modulator reflecting a modulated third color component back to said polarization beam splitter prism.

8. The projection display of claim 7, wherein:

said color splitter prism set includes first and second color splitter prisms, each of which has a total reflection first side, a light splitting second side, and a third side;

said total reflection first side of said second color splitter prism being disposed adjacent to said second side of said polarization beam splitter prism;

said light splitting second side of said second color splitter prism being disposed adjacent to said total reflection first side of said first color splitter prism;

said third side of said second color splitter prism being disposed adjacent to said second light modulator;

said second color splitter prism being adapted to receive the first and second color components and the light leakage component from said polarization beam splitter prism at said total reflection first side thereof, to allow the first color component and the light leakage component to pass directly through said light splitting second side thereof, and to reflect the second color component to pass through said third side thereof for reception by said second light modulator.

9. The projection display of claim 8, wherein said light splitting second side of said first color splitter prism is disposed adjacent to said first light modulator, said first color splitter prism being adapted to receive the first color component and the light leakage component from said second color splitter prism at said total reflection first side thereof, to allow the first color component to pass directly through said light splitting second side thereof for reception by said first light modulator, and to reflect the light leakage component to pass through said third side thereof.

10. The projection display of claim 8, wherein said third side of said first color splitter prism is disposed adjacent to said first light modulator, said first color splitter prism being adapted to receive the first color component and the light leakage component from said second color splitter prism at said total reflection first side thereof, to allow the light leakage component to pass directly through said light splitting second side thereof, and to reflect the first color component to pass through said third side thereof for reception by said first light modulator.

11. The projection display of claim 8, wherein said total reflection first side of said first color splitter prism and said light splitting second side of said second color splitter prism form a clearance therebetween.

12. The projection display of claim 7, further comprising a first light polarization selector disposed adjacent to said first side of said polarization beam splitter prism and adapted to convert the polarization state of the third color component, said polarization beam splitter prism receiving the input light beam from said first light polarization selector.

13. The projection display of claim 12, wherein said polarization beam splitter prism receives from said color splitter prism set the modulated first and second color components at said second side thereof, and receives from said third light modulator the modulated third color component at said third side thereof.

14. The projection display of claim 13, further comprising a second light polarization selector disposed adjacent to said fourth side of said polarization beam splitter prism, said second light polarization selector receiving the modulated first, second and third color components from said polarization beam splitter prism, and being adapted to convert the polarization state of the modulated third color component.

15. The projection display of claim 14, further comprising a polarizer disposed adjacent to said second light polarization selector so as to receive the modulated first, second and third color components therefrom, said polarizer being adapted to absorb light of a first polarization state and to permit light of a second polarization state to pass therethrough.

16. The projection display of claim 12, wherein said first light polarization selector includes:

a first dichroic mirror adapted to receive the first, second and third color components having a first polarization state, said first dichroic mirror allowing said first and second color components to pass therethrough in a first direction, and reflecting the third color component such that the third color components travels in a second direction transverse to the first direction;

a first reflective mirror for reflecting the first and second color components from said first dichroic mirror such that the first and second color components travel in a third direction transverse to the first direction and parallel to the second direction;

a second reflective mirror for reflecting the third color component from said first dichroic mirror such that the third color component travels in a fourth direction transverse to the second direction and parallel to the first direction;

a second dichroic mirror for receiving the first and second color components from said first reflective mirror; and a half-wavelength plate disposed between said second reflective mirror and said second dichroic mirror, and converting the polarization state of the third color component to a second polarization state before the third color component reaches said second dichroic mirror;

wherein the input light beam is obtained by said polarization beam splitter prism from said second dichroic mirror, and includes the first and second color components having the first polarization state and further includes the third color component having the second polarization state.

\* \* \* \* \*